Patented Nov. 4, 1941

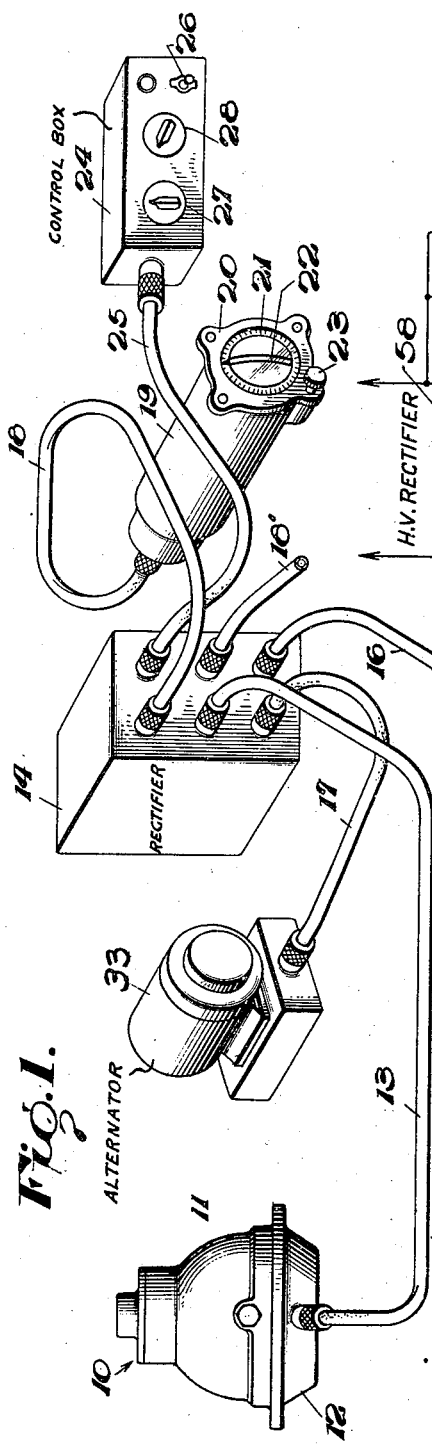

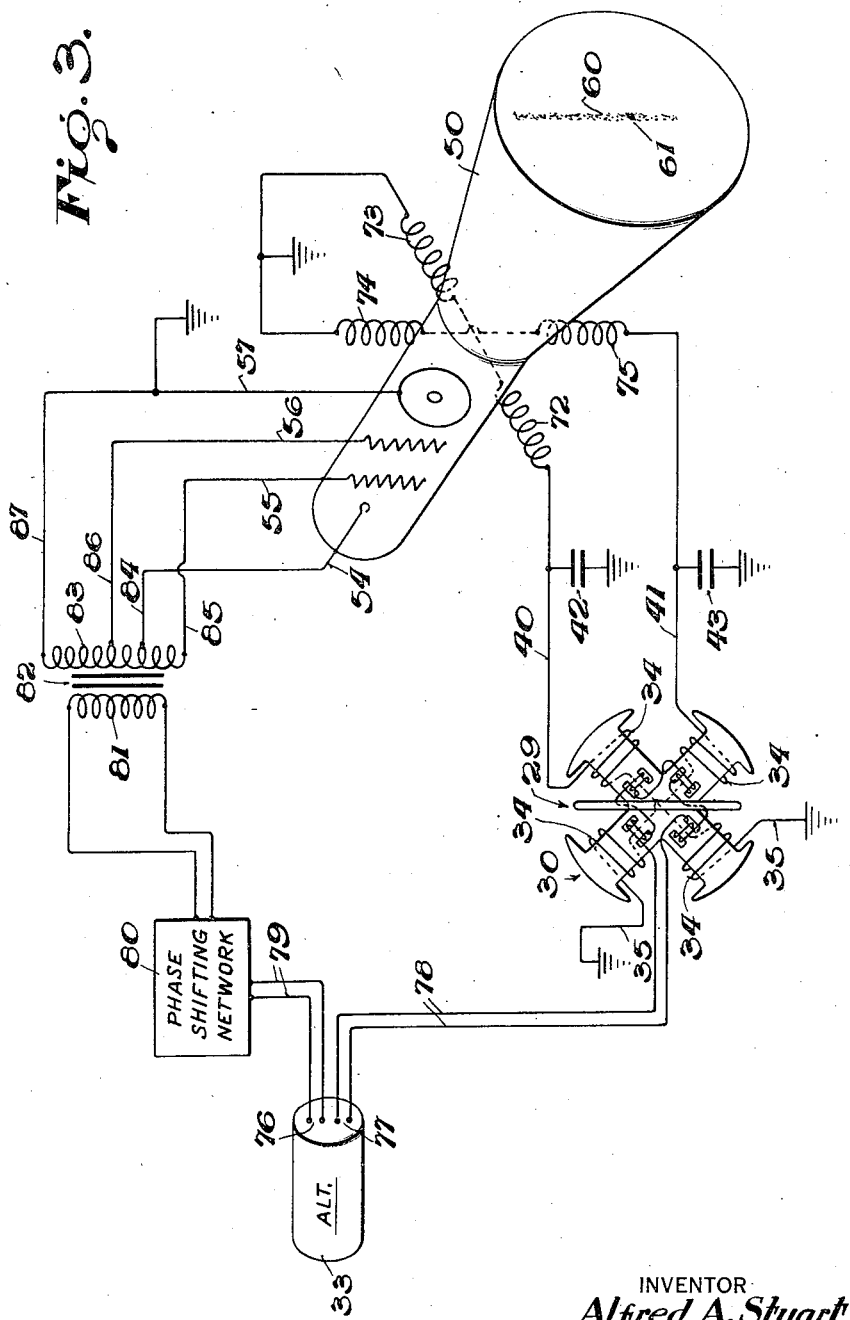

2,261,309

UNITED STATES PATENT OFFICE 2,261,309

NAVIGATIONAL INSTRUMENT

Alfred A. Stuart, Jr., Closter, N. J., assignor to Bendix Aviation Corporation, South Bend, Ind., a corporation of Delaware Application June 29, 1940, Serial No. 343,275

12 Claims. (Cl. 33—204)

This invention relates to navigational instruments and particularly to magnetic compasses.

It is the object of the present invention to provide a magnetic compass of either the needle or earth inductor type, which will give a remote bearing indication upon a cathode ray tube viewing screen.

It is another object of the present invention to provide a compass having a cathode ray tube indicator, wherein the entire electrical energization of said compass and said indicator is by means of alternating current.

It is a further object of the invention to provide a compass having a cathode ray indicator which is capable of orientation to a predetermined course-defining position.

Other objects of the present invention are the obtaining of an indication for navigational instruments which will be inertialess and which may be repeated at any number of desired stations.

These and other objects of the present invention will become readily understood upon a study of the following specification when made in conjunction with the attached drawings, throughout which like parts are designated by like reference characters.

Fig. 1 is a perspective of the complete equipment required for operation of one form of the compass of the present invention;

Fig. 2 is a schematic diagram of the system illustrated in Fig. 1;

Fig. 3 is a schematic diagram showing another embodiment of the present invention;

Figure 5:
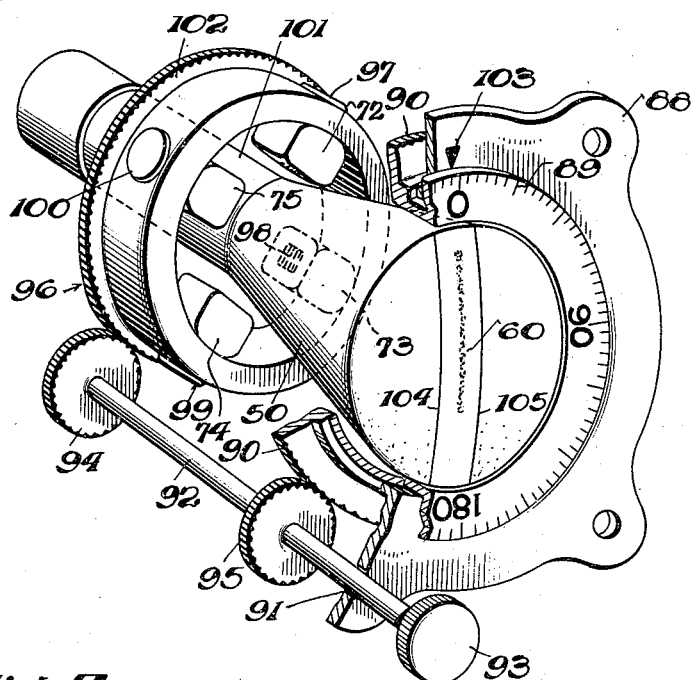
Fig. 5 is a perspective view illustrating a novel course-indicating and selecting means applicable to the system shown in Fig. 3.

In general, the present invention includes a magnetic flux gate which may be disposed within the influence of the magnetic field of a compass magnet, or which may act as a direct pick-up of the earth's magnetic field, and a cathode ray tube indicator which is connected to the flux gate in a novel manner to give an indication of bearings in azimuth.

In one form of the invention, the complete flux gate and cathode ray tube circuits are energized solely by alternating current. Also, in one form, there is provided a means whereby indications of azimuth may be referred to a vertical or other predetermined plane for the facile interpretation of the course of a carrying vessel.

Having particular reference to Fig. 1, there is shown a housing 10, which includes an upper bowl portion 11, of non-magnetic material, such as aluminum, "Bakelite," etc., containing a compass magnet or magnets carried by a suitable float in a damping liquid, and a lower housing 12, which contains a magnetic flux gate and which is separated from bowl portion 11 by a liquid-tight partition. A schematic showing of a compass needle and a flux gate in a housing such as housing 10, is contained in the application of Paul A. Noxon, Serial No. 340,396, filed June 13, 1940, and assigned to the assignee of the present invention. A cable 13 connects the flux gate within housing 10 to a cabinet 14, which contains a vacuum tube rectifier of any type suitable for delivering voltages on the order of those needed to energize the compass indicator to be described. The rectifier within cabinet 14 is energized by means of an alternator 33, which is run from a battery, not shown, through a cable 16, which is connected thereto by means of cable 17. The output of rectifier within cabinet 14 is connected through cable 18 to suitable electrodes within a cathode ray tube contained in casing 19. A second cathode ray indicator, not shown, may be connected to cable 18'. Casing 19 includes, at its forward end, a standard panel mounting plate 20, which carries a fixed azimuth scale 21, and grid lines 22 which may be rotated into any angular position by means of a ring gear and pinion train, not shown, actuated by a knob 23. A control box 24 is connected through flexible cable 25 to cabinet 14. This control box is intended for installation at the pilot's or navigator's position, and contains a power switch 26, a cathode ray beam focusing control 27, and a brilliance control 28, as will be fully described later.

The system pictorially represented in Fig. 1 is schematically shown in Fig. 2, wherein 29 represents the magnetic compass needle contained in compass bowl 11, and 30 represents the flux gate disposed within housing 12 beneath compass bowl 11. Flux gate 30, of permeable material such as "Permalloy" or "Mumetal", has four leg members 31 placed at right angles and functionally, is identical to the three-legged flux gate described more fully in application Serial No. 336,444, filed May 21, 1940, and assigned to the assignee of the present invention. The central portions of legs 31 carry coils 32 connected in series to a source of alternating current 33. Coils 32 and alternator 33 comprise the exciting means whereby the central portion of the flux gate 30 is alternately saturated and unsaturated to cause voltages to be induced in output windings 34 carried by legs 31. Opposite pairs of windings 34 have one end grounded as shown at 35, and the other end connected to the primaries 36 and 37 of transformers 38 and 39, through conductors 40 and 41, respectively. As will be more particularly described later, the reluctance of the center portion of legs 31 is periodically changed from a minimum to a maximum value which results in a substantial change in the number of lines of flux of magnetic needle 29 threading through legs 31. The parts of legs 31 that carry coils 34 are not saturated by flux due to alternator 33 and winding 32, but when winding 32 causes saturation, the reluctance of the path between the outer portions of opposite pairs of legs 31 will become extremely high and when the central portion of flux gate 30 is not saturated, the reluctance will be extremely low. Twice during each half-cycle of saturating current from source 33, the reluctance is changed and thus twice during each half-cycle voltage pulses are generated in each of the windings 34. A particular saturating and unsaturating sequence will be later described. These windings may be resonated by means of suitable condensers 42 and 43, which are connected in shunt to opposite pairs of coils 34 and primaries 36 and 37 of transformers 38 and 39. The secondaries 44 and 45 have their inner ends connected together and to ground, and their outer ends connected through conductors 46 and 47 to deflecting plates 48 and 49, within cathode ray tube 50. Deflecting plate 48 and plate 51 may be referred to as the vertical deflecting plates, and plate 49 and plate 52 may be referred to as the horizontal deflecting plates. Plates 51 and 52 are connected together and to ground through conductor 53.

Cathode ray tube 50 contains cathode element 54, which may be heated to incandescence by any desirable means, not shown, control grid 55, anode 56, and accelerating anode 57. All of these electrodes are connected to various points along a voltage divider 58, which is connected to any suitable high voltage rectifier, not shown. It will be readily understood that the cathode, grid, and anode electrodes of tube 50 will have voltage relations conventional in cathode ray tubes, so that with no deflecting voltage on plates 48 to 51, the cathode ray beam will impinge upon the fluorescent screen 59, at only the center 61, thereof. The brilliance of the beam formed on cathode ray screen 59 is regulated by adjusting the bias of control grid 55 through tap 26 (which is the brilliance control mentioned in the description of Fig. 1 above), and the focus of the beam on screen 59 is governed by adjustment of the voltage of anode 56 through tap 27, mentioned in the description of Fig. 1. As these controls are conventional, further explanation thereof is believed unnecessary. When voltages, due to output windings 34 of flux gate 30, are impressed upon the deflecting plates through transformers 38 and 39, a radial line of light will be formed and its angular position with respect to some plane, such as a vertical plane passing through the screen 59, will be dependent upon the angular relation between a particular axis of flux gate 30 and of the magnet 29. Therefore, for every degree of variation between magnet 29 and flux gate 30, there will be a like angular variation between reference plane of screen 59 and the angular position of the line of light or luminous pointer, such as 60.

Flux gate 30 will be fixed to the carrying craft, such as an airplane, with its four legs 31 in a normally horizontal plane within the housing 12, and one or more compass magnets, such as needle 29, will be enclosed within compass bowl 11 and mounted for free rotation therein. In the relation shown in Fig. 2, the needle 29 bisects the angle between two pairs of rectangularly spaced legs 31 and the resultant trace on the cathode ray tube screen 59 is a vertical line of light. Magnet 29 is responsive to the directive force of the earth's magnetic field and upon a change in heading of the carrying vehicle, the angular relation between leg members 31 and needle 29 will be changed.

It will be seen that changes in the angle between flux gate legs 31 and needle 29 will change the peak value of alternating current voltages set-up in the different leg members, and it has been found that the value of voltage in legs 31 will vary in accordance with the well known cosine law of variation which is mentioned for example in the patent to Bechberger, 2,206,018. As needle 29 rotates with respect to legs 31 the voltages in pairs of coils 34 will be changed in accordance with this law and will accordingly change the voltage across opposite pairs of deflecting plates 48, 52 and 49, 51, resulting in a radially extending trace of a light 60, which will vary in angular relation with respect to a fixed axis (such as a vertical line) in the same manner that the relation between legs 31 of flux gate and needle 29 is changed; thus, as the heading of the carrying craft changes in azimuth the change will be indicated degree for degree by means of the line of light 60.

An inspection of the indicating line of light 60 shown in Figs. 2 and 3, shows that the bottom portion of the line, measured from center point 61 of screen 59, is shorter than the top portion of indicating line 60. As the present invention is intended to indicate bearings throughout 360 degrees, 180 degree ambiguity is eliminated by controlling the excitation of the flux gate in a particular manner so that a pilot or navigator may know at a glance which end of the line of light 60 is the indicating or pointer end.

Figure 4:
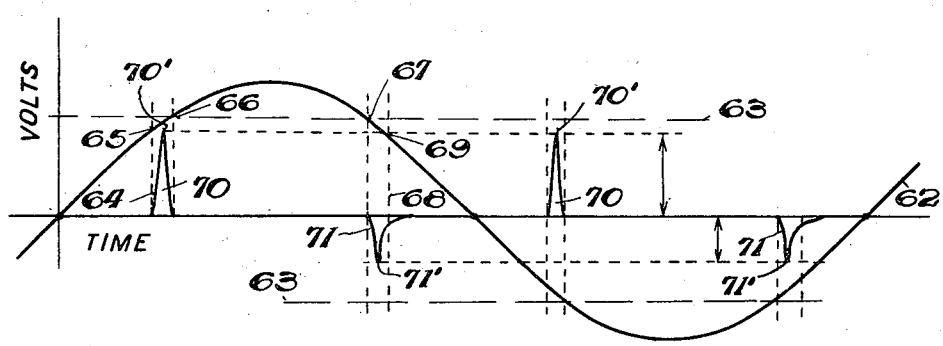
Fig. 4 is a graphic representation of certain voltage relations utilized in the present invention.

Having particular reference to Fig. 4, curve 62 represents a sine wave of excitation voltage supplied by alternator 33, and dashed lines 63 represent the value of voltage necessary to complete saturation of the center portion of the flux gate 30. The intersection of line 64 at point 65 represents the point in the exciting cycle at which saturation begins, and the intersection of curve 62 and line 63 at point 66 shows the point in the exciting cycle at which flux, due to the current from alternator 33, completely saturates the central portion of the flux gate. Point 67 represents that instant in the exciting cycle at which the current from alternator 33 begins to be insufficient to maintain the flux gate saturated, and point 69, which designates the intersection of curve 62 and line 68, represents the point at which the desaturating interval is completed. The rate at which saturation takes place depends upon the tangents of curve 62 between points 65 and 66, and the magnetic field of magnet 29 leaves legs 31 at the rate measured by the tangents between these points. When the flux gate begins to be unsaturated, however, the rate at which the field of magnet 29 returns to legs 31 depends, not upon the tangents between points 67 and 69, but upon the magnetomotive force available in the field. As shown, it takes a greater interval to generate curves 71 than 70. Therefore, by choosing values of alternating current that will drive out flux due to the field of magnet 29 at a rate greater than that at which the field reenters flux gate 30 upon desaturation, a greater voltage, indicated by peak 70' of the curve 70, is induced in windings 34 upon saturation than is induced in windings 34 upon desaturation. The direction of the flux through the gate determines whether the positive or the negative peak is the greater, hence, the true sense of direction is indicated by the position of the long end of indicating line 60. This last voltage (negative peak) is represented by the peak 71' of the curve 71. Thus, while two peaks of alternating current are established in the output coils 34 for every half cycle of exciting current, the first peak 70' will be greater than peak 71', and the result is that the deflection of the cathode ray beam due to the voltage peak 70' will be greater than the deflection of the beam due to the voltage peak 71' induced in windings 34. Since the voltage peak 70' is of opposite polarity to peak 71', the deflections of the cathode ray beam will be upon opposite sides of center 61 and it will be readily seen, therefore, that pointer 60 is thus given a unilateral indicating quality and 180 degree ambiguity is avoided.

There is shown a second embodiment of the present invention in Fig. 3, in which magnet 29 and flux gate 30 are the same, and perform in the same manner, as has been set forth in the description in Fig. 2. However, Fig. 3 shows the use of a cathode ray tube having electromagnetic, rather than electrostatic deflecting means. Conductors 40 and 41 are connected to pairs of deflecting coils 72, 73, and 74, 75, which pairs are disposed 90 degrees apart. These coils are placed outside cathode ray tube 50 and are made to be adjustable, as will be set forth in the description of Fig. 5.

Alternator 33 has two output sections 76 and 77, one of which is connected through conductors 78 to the exciting windings 31 to 34, on flux gate 30, and section 76 is connected through conductors 79 to a phase adjusting network 80, the output of which is connected to primary 81 of a transformer 82. Phase shifting network 80 may be composed of any conventional combination of reactances and resistances commonly utilized to effect phase shifts. The secondary 83 of transformer 82 is connected to the conventional electrodes of cathode ray tube 50 in a unique manner which will now be described.

Cathode 54, control grid 55, anode 56, and accelerating anode 57 are connected to secondary 83 of transformer 82 by taps at points 84, 85, 86 and 87, respectively, which taps represent voltage points of such values that the instantaneous voltage relations among the different electrodes will be similar to the relations existing across voltage divider 58. At some particular instant, tap 85 may be considered the negative end and tap 87 the positive end of secondary 83. Since output coils 34 have an alternating current induced therein of twice the frequency of the source of excitation, there will be two alternations of current in each of the deflecting coils 72 to 75 for each alternation of current in secondary 83. With the proper relation of phase between the voltages in deflecting coils 72 to 75, and the voltage across secondary 83, cathode ray beam indicator 60 will be a continuous radial line of light of substantially uniform intensity along its length. Completely satisfactory operation of the cathode ray tube 50 by alternating current is therefore possible. The phase relation proper to keep line 60 a closed line is obtained by means of the phase adjusting network 80, which may be any conventional phase shifting means.

Means whereby the deflecting coils 72, 73, 74 and 75 may be rotated in order that correct course indications of the compass may be indicated as a vertical line of light is shown in Fig. 5. Cathode ray tube 50 may be mechanically supported by any suitable cushioning means, not shown, and its longitudinal axis extends at right angles to a panel mounting plate 88 of conventional design, in which there is rotatably supported, by any suitable means, not shown, an annular azimuth scale 89 having teeth 90 on the periphery of a flanged portion thereof. Plate 88 is provided with an aperture 91 through which extends a shaft member 92 having at its outer end an adjusting knob 93, and at its other end a pinion 94. An additional pinion 95, engaging with teeth 90 on annular scale 89, is positioned intermediate the ends of shaft 92, and both pinions 94 and 95 are rotatable upon the turning of adjusting knob 93. The yoke member 96 of any suitable material, such as soft iron, carrying pole pieces 97, 98, 99 and 100, about which are wound the deflecting coils 72, 73, 74 and 75, respectively, is supported by any suitable means, not shown, about throat portion 101 of cathode ray tube 50, and may be rotated upon manipulation of knob 93 by means of ring gear 102 which engages with pinion 94. Index 103 acts as a lubber mark, so that on-course indications are represented by the line of light 60 appearing directly vertically as shown in Fig. 5, opposite index 103. Parallel lines 104 and 105 may be painted or etched upon the surface of screen 59, and after any desired course is selected by rotating scale 89 and yoke 96 until the value of the course in degrees appears on scale 89, opposite index 103, the craft may be steered until luminous pointer 60 becomes vertical and thereafter the selected course may be readily maintained by merely keeping pointer 60 parallel to lines 104 and 105.

While the above description of the present invention involves a compass magnet 29 as the element from which indications are obtained on the cathode ray screen 59, it is also intended that flux gate 30 may act as an earth inductor element independently of the magnetic compass needle, such as 29. It is necessary only to eliminate needle 29, and to keep the legs of flux gate 30 in a horizontal plane. This may be done by mounting flux gate 30 upon a gyro-horizon or other stable device. One manner of mounting a flux gate on a gyroscope is shown in the drawing of the co-pending application Serial No. 336,444 referred to above.

Flux gate 30 is shown as being composed of four legs 31, but it is intended that other numbers of legs than four may be used in the present invention. For example, it has been found that a three-legged flux gate, the legs of which are disposed symmetrically at 120 degrees, works well with a system similar to that shown in Fig. 3, where three magnetic deflecting coils, disposed 120 degrees apart, are utilized instead of the four coils 72 to 75, which are shown.

The term "flux gate" as used in this specification includes a permeable member having fixed output windings for connection to an indicating circuit and having a means for changing the overall permeability of the member so that steady flux in the permeable member will be changed to an alternating or intermittent flux upon the change of permeability of the member, and does not include an earth inductor element such as a rotating coil.

As indicated in the description of Fig. 1, a second cathode ray tube may be connected to cable 18', and thus, an indication of compass bearing may be had at a station remote from the pilot, if so desired. Any number of repeaters may be supplied of course, and one of the principal advantages of the present invention lies in the ease with which multiple indications may be obtained. The cathode ray beam being inertialess, pointer 68 is free of the usual vibration or hunting found in mechanical needles, and the line of light, which is usually green, forms an indicator that is extremely easy for a navigator to read.

While only two embodiments of the present invention have been shown in the drawing, it is to be understood that various changes may be made without departing from the scope of the present invention. For this reason, it is intended not to limit the invention by the description herein given as an example, but solely by the scope of the appended claims.

What is claimed is:

1. A compass comprising a magnet mounted for free rotation in the earth's magnetic field, a magnetic flux gate adjacent said magnet and subject to the directive influence of the field of said magnet, said flux gate comprising a body for attachment to a vehicle and carrying output coils thereon in which are induced voltages depending upon the angular relation between an axis of said magnet and an axis of said flux gate, a cathode ray tube having a fluorescent screen and a circuit for establishing a cathode ray in said tube, deflecting members associated with said tube, and connections between said output coils and said deflecting members, whereby magnetic bearings are indicated on said fluorescent screen.

2. A compass comprising a magnet mounted to follow the direction of the earth's magnetic field in azimuth, a flux gate of high permeable material mounted within the influence of said magnet, a cathode ray tube having a fluorescent screen and circuit means for establishing a cathode ray, ray deflecting means associated with said cathode ray tube, and connections between said flux gate and said deflecting means for deflecting said cathode ray into a radial, indicating pencil of light.

3. A compass comprising a magnetic flux gate disposed in the earth's magnetic field, a cathode ray tube, means associated with said tube to establish a cathode ray, deflecting means associated with said cathode ray tube, and connections between said flux gate and said deflecting means for operating said cathode ray to indicate magnetic bearings.

4. A compass comprising a flux gate disposed in the earth's magnetic field, a cathode ray tube having means for establishing a cathode ray, a fluorescent screen carried by said tube, deflecting plates therein, coils carried by said flux gate, and connections between said deflecting plates and said coils for controlling the movement of said cathode ray to indicate magnetic bearings.

5. A navigational instrument including a cathode ray tube containing means for establishing a cathode ray beam, a fluorescent screen carried by said cathode ray tube, a magnetic pick-up device of permeable material having an exciting winding, legs and output windings carried by said legs, deflecting coils associated with said cathode ray tube, connections between said coils and said output windings, whereby upon alternate saturation and unsaturation of a portion of said magnetic pick-up device by said source of alternating current and said exciting winding, alternating currents will be set up in said coils to deflect said cathode ray beam and make a trace of light on said fluorescent screen.

6. A navigational instrument comprising a magnetic flux gate having a saturating winding thereon, a cathode ray tube having means for establishing a cathode ray beam, a fluorescent screen carried by said tube, and so situated that said cathode ray beam may impinge thereon, a source of alternating current for energizing said flux gate through said saturating winding, deflecting coils associated with said tube, and connections between said coils and said flux gate for deflecting said cathode ray beam upon said screen, said means for establishing said cathode ray beam including connections to said source of alternating current and being independent of direct current energization, whereby the trace of said cathode ray beam on said screen will indicate a condition of navigation.

7. A navigational instrument comprising electrical means for representing angular position of an element, a cathode ray tube having means for establishing a cathode ray beam, a fluorescent screen carried by said tube, a source of alternating current for energizing said electrical means, deflecting members associated with said tube, and connections between said deflecting members and said electrical means for deflecting said cathode ray beam upon said screen, said means for establishing said cathode ray beam including connections to said source of alternating current and being independent of direct current energization.

8. A navigational instrument comprising electrical means for representing angular position of an element, a cathode ray tube having means therein for establishing a cathode ray beam, and means for energizing said cathode ray beam establishing means, a fluorescent screen carried by said tube, a source of alternating current for energizing said electrical means, deflecting members associated with said tube, and connections between said deflecting members and said electrical means for deflecting said cathode ray beam upon said screen, said energizing means being constituted solely and entirely by said source of alternating current.

9. A navigational instrument having a cathode ray tube as an indicating member, which includes an electrical means for designating the angular position of an element, a source of alternating current for energizing said electrical means, deflecting means carried by said cathode ray tube, means for establishing a cathode ray beam, and circuit connections between said deflecting means and said electrical means, said means for establishing said cathode ray beam including connections to said source of alternating current and being independent of direct current energization.

10. A navigational instrument comprising a magnet rotatable in azimuth, a flux gate within the influence of the field of said magnet, a cathode ray tube having means for establishing a cathode ray beam, a viewing screen carried by said tube, a source of alternating current for energizing said flux gate, beam deflecting members associated with said tube, and circuit connections between said members and said flux gate for deflecting said cathode ray beam upon said viewing screen, said means for establishing said cathode ray beam including a circuit energized by said source of alternating current independently of any direct current energization.

11. A navigational instrument comprising an annular scale, a cathode ray tube indicator having a screen, magnetic deflecting coils externally of said tube and connected to cause said cathode ray to form a radial pencil of light upon the screen of said cathode ray tube, and means for simultaneously rotating said scale and said deflecting coils to orient said pencil of light into a predetermined position whereby deviation of said pencil of light from said position is indicative of a change in a navigational condition being measured by said instrument.

12. A compass comprising means for defining the direction of the earth's magnetic field in azimuth, a cathode ray tube indicator having a fluorescent screen connected to said means, an annular azimuth scale about the periphery of said screen, magnetic deflecting coils, a yoke member for supporting said coils externally of said tube, and means for simultaneously rotating said coil and said yoke to orient said line of light into a predetermined course-defining position.

ALFRED A. STUART, JR.